United States Patent [19]

Noda

[11] 4,173,316
[45] Nov. 6, 1979

[54] FISHING REEL

[75] Inventor: Hideo Noda, Sakai, Japan

[73] Assignee: Shimano Industrial Company, Limited, Osaka, Japan

[21] Appl. No.: 818,659

[22] Filed: Jul. 25, 1977

[30] Foreign Application Priority Data

Aug. 7, 1976 [JP] Japan .......................... 51/105573[U]
Aug. 12, 1976 [JP] Japan .......................... 51/109208[U]

[51] Int. Cl.² ............................................. A01K 89/01
[52] U.S. Cl. ............................................... 242/84.2 R
[58] Field of Search ................. 242/84.2 A, 84.2 R, 242/84.21 A, 84.21 R, 84.2 F, 84.2 H, 84.5 R, 84.5 A, 84.51 R, 84.5 R; 188/82.4, 82.7, 82.2; 74/576, 577 M, 577 R

[56] References Cited

U.S. PATENT DOCUMENTS

| 2,546,465 | 3/1951 | Martini | 242/84.21 R |
| 2,767,935 | 10/1956 | Fowler | 242/84.2 F |
| 2,775,417 | 12/1956 | Freund | 242/84.21 R |
| 2,862,679 | 2/1958 | Denison et al. | 242/84.2 A |
| 3,061,230 | 10/1962 | Gayle | 242/84.5 A X |
| 3,185,406 | 5/1965 | Ament | 242/84.5 A |
| 3,222,010 | 12/1965 | Borgström et al. | 242/84.2 A |
| 3,989,204 | 11/1976 | Lemery | 242/84.5 R |

FOREIGN PATENT DOCUMENTS 558986  6/1958  Canada ............................. 242/84.2 R Primary Examiner—Billy S. Taylor
Attorney, Agent, or Firm—Stevens, Davis, Miller & Mosher

[57] ABSTRACT

A fishing reel having a rotatable shaft directed vertically with respect to a handle shaft on a reel body is mounted to a fishing rod through a mounting leg in such a manner that a cover for covering a spool and a rotary frame, is provided with a through hole whose center line extends substantially at a right angle with respect to the longitudinal direction of the rod so that a fishing line may be drawn out substantially at a right angle toward the tip of the rod through the hole, the reel body being mountable to the rod in four different positions.

1 Claim, 12 Drawing Figures

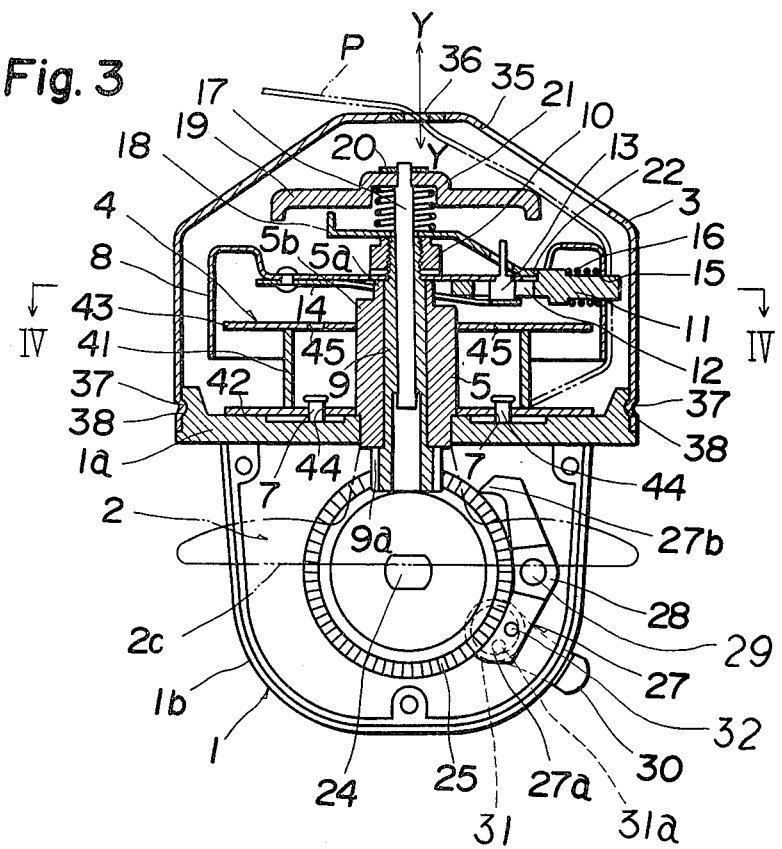
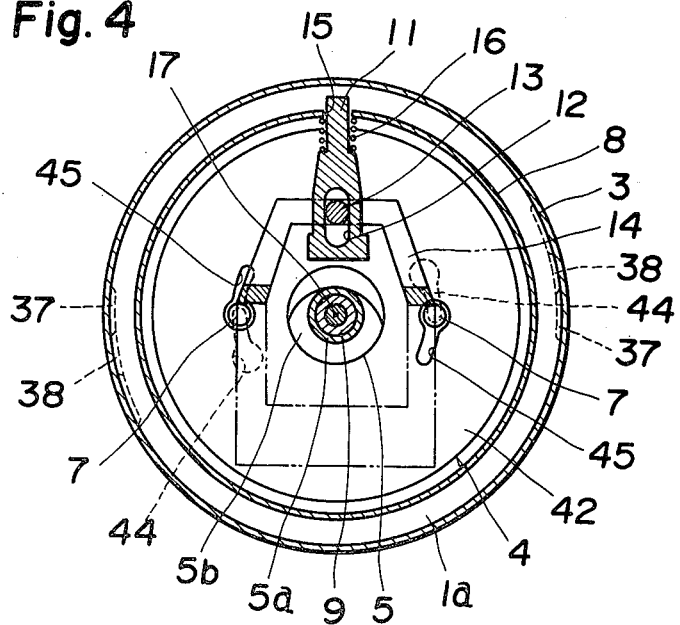

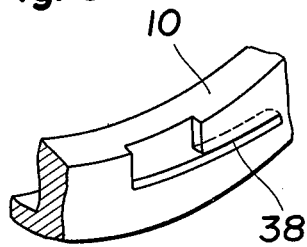
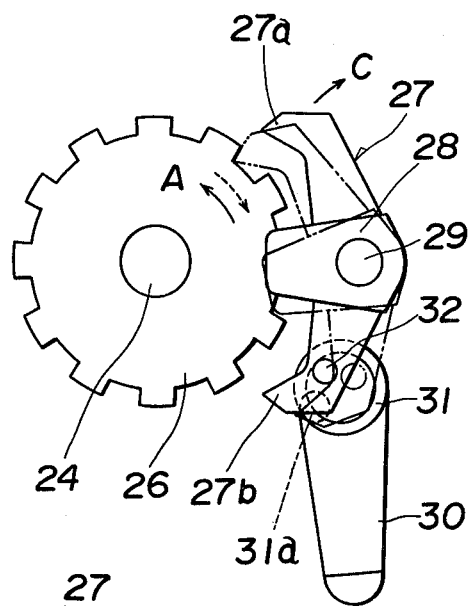
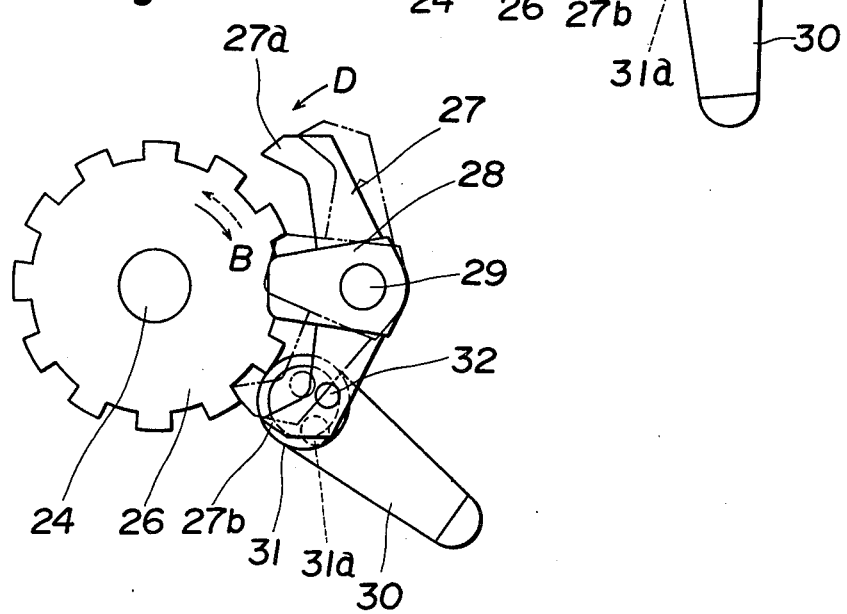

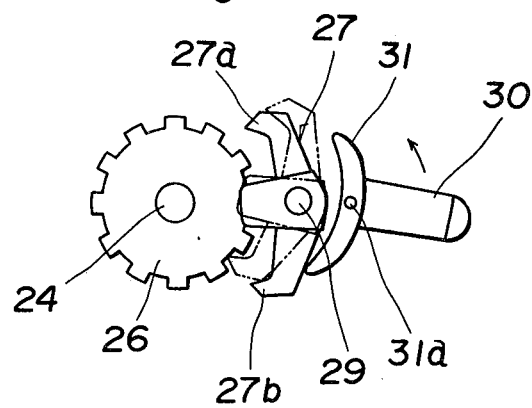
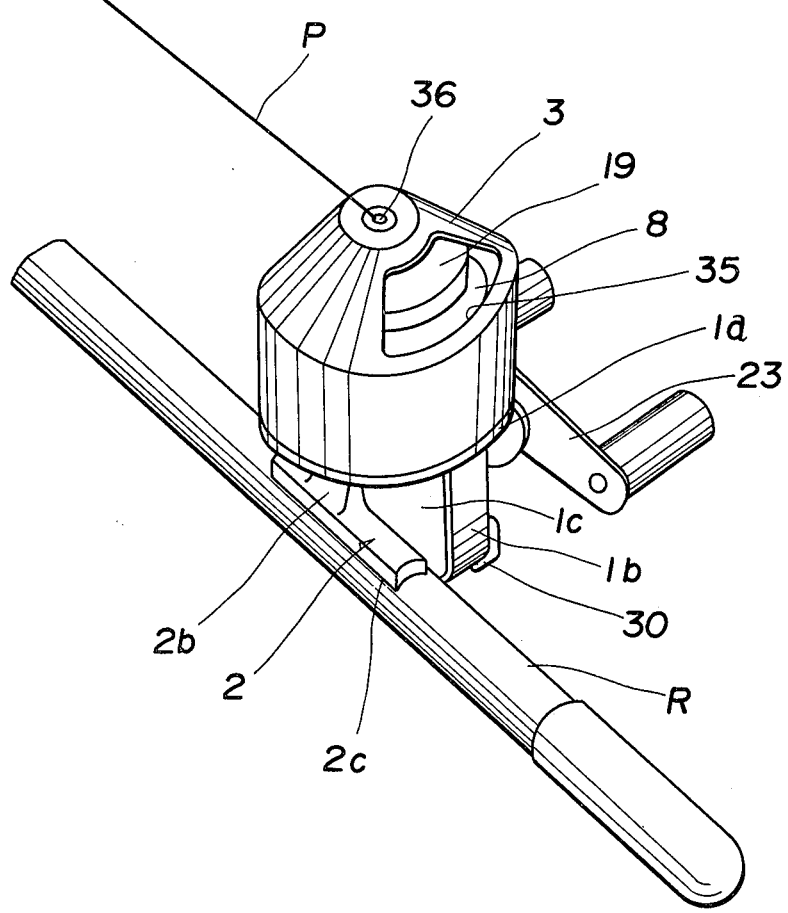

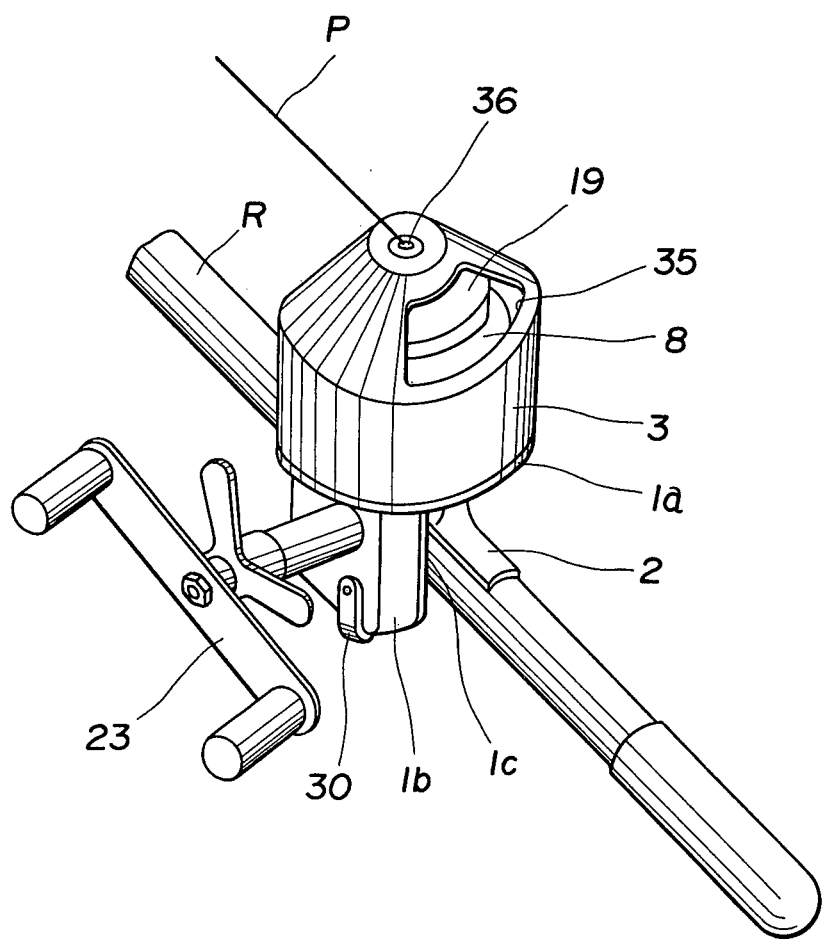

FISHING REEL

This invention relates to a fishing reel and more particularly to a fishing reel, the so-called closed face reel, attached to a fishing rod to be used for winding a fishing line onto a spool by manipulating a handle bar.

Conventionally, this kind of closed face reel is constituted of a spool for winding thereon the fishing line and a rotatable frame leading the line to the spool, which spool and rotatable frame are covered with a cover of a conical front portion and having at the fore end a hole through which the line passes, so that the handle bar is operated to rotate the rotatable frame for winding the line on the spool.

The through hole at the fore end of the cover is most remote from the reel body carrying the handle bar and is, when the reel is attached to the rod, directed at the center line lengthwise of the fishing rod. Hence, there has been the problem in that the line is hard to be slowed by the so-called thumbing when drawn from the spool for casting or wound on the spool after hooking a fish. Also it cannot be accurately slowed even with the thumbing.

It is desirable for an angler to be able to cast a plug on a reeled line toward a certain location and play a hooked fish by easy and reliable thumbing.

In other words, the line drawn from the spool for casting is slowed so as to enable the angler to cast the plug toward the desired location and the line wound on the spool for fishing is retarded to enable him to play a hooked fish. However, the conventionally closed face reel is not constructed so as to be easily and accurately slowed while the fishing line is running from or being wound on the spool.

This invention has been designed to eliminate the aforegoing defects. A main object of the invention is to provide a fishing reel which enables the running of the line to be desirably easily and accurately slowed when drawn from or wound on the spool by thumbing. As a result, the angler can enjoy himself more. Another object of the invention is to provide a fishing reel mountable in four positions, such as, a first position where the reel body is above the rod gripped by the angler and the handle bar is at the right hand, a second position where the reel body is above the rod and the handle bar is at the left hand, a third position where the reel body is below the rod and the handle bar is at the right hand, and a fourth position where the reel body is below the rod and the handle bar is at the left hand.

The fishing reel of the invention comprises a reel body provided with a handle shaft and a rotatable shaft driven thereby which are at a right angle to each other, a spool and a rotatable frame arranged around the rotatable shaft, and a mounting leg for mounting the reel body to the rod and having a mounting seat face extending lengthwise thereof to be at a right angle with respect to the axis of the rotary shaft, so that the reel body is mounted to the rod through the mounting leg. A through hole is formed in the cover for covering the spool and rotary frame in which the center line extends to intersect substantially at a right angle with the longitudinal direction of the rod. The line can be drawn out toward the tip of the rod in the relation of being bent at the hole substantially at a right angle with respect to the center line thereof. Even when the reel body is changed in its mounting position to the rod to allow the rotatable frame to be reversely rotated by the handle bar, the spool can be turned over and attached to the reel body to wind the line on the spool and also retaining pawls can be controlled to be meshed with an anti-reverse gear.

Hence, the angler puts on the outside of the cover the thumb or forefinger of his hand gripping the rod so that the line may be slowed easily and properly when drawn from or wound on the spool and also he can facilitate the reel control even when the reel body is mounted in any of the aforesaid four positions.

These and other objects and advantages of the invention will be detailed in the following description in accordance with the accompanying drawings, in which:

FIG. 3 is a longitudinal sectional side view of the same,

FIG. 4 is a partially omitted cross section taken on Line IV—IV in FIG. 3,

FIG. 5 is a perspective view of a part of a disc of the reel body,

FIGS. 6 and 7 are illustrations showing the relation between retaining pawls and a control at an anti-reverse-rotation mechanism, FIG. 8 is an illustration showing a modified embodiment of the control, and FIGS. 9 to 12 are perspective views showing the reel of the invention, exemplified in its various mounting positions.

In FIGS. 1 through 4, there is shown a reel body 1 a mounting leg 2 for mounting the reel body 1 to a fishing rod R; and a cover 3 detachably attached to the reel body 1.

Figure 1:
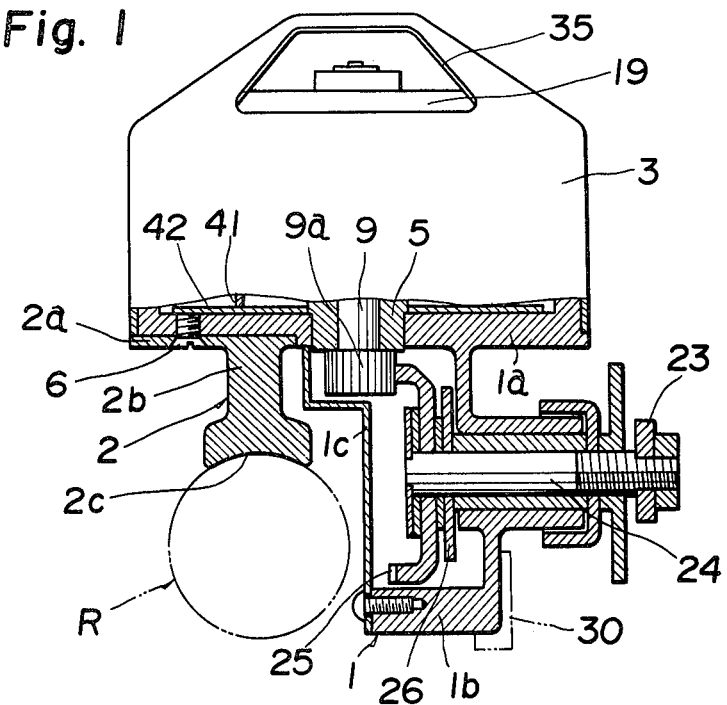
FIG. 1 is a partially cutaway front view of the reel of the invention.
Figure 2:
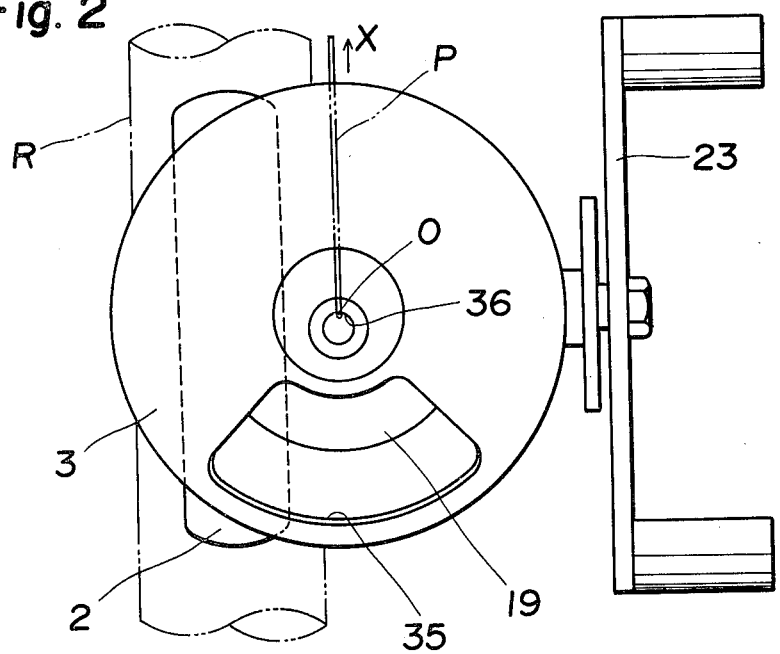
FIG. 2 is a plan view thereof.

The reel body 1, as shown in FIGS. 1 and 3, is composed of a disc $1a$, a casing $1b$ extending at a right angle with respect to the flat surface of the disc $1a$, and a lid $1c$ closing the opening of the casing $1b$. The disc $1a$ is provided at a substantially central portion thereof with a hole through which a tubular shaft 5 is insertably fixed. Tubular shaft 5 is rotatably supports a rotatable shaft 9. The casing $1b$ supports thereon a handle shaft 24 to be hereinafter described, in the relation that the axis thereof intersects with that of the rotary shaft 9, and also houses a transmission to be hereinafter described, through which the rotatable shaft 9 is rotated by the handle shaft 24.

The mounting leg 2, which has a fixing base $2a$, a trunk $2b$ and a mounting seat face $2c$, is detachably fixed to the rear surface of the disc $1a$ at one side of the casing $1b$ by a screw 6 through the fixing base $2a$. The trunk $2b$ extends parallel to the axis of the rotatable shaft 9 and at the end of the trunk is formed the mounting seat face $2c$ of a length extending lengthwise of the rod R. The mounting seat face $2c$ is directed substantially at a right angle with respect to the axis of the rotatable shaft 9, whereby the reel body 1 is attached to the rod so that the rotatable shaft 9 may be directed vertically with respect to the direction of the length of the fishing rod R.

In other words, the cover 3, which is attached to the disc $1a$ for covering a spool 4 and a rotatable frame 8 to be described hereinafter, is provided with a well-known through hole 36 for the fishing line. The through hole 36, when the reel body 1 is attached to the rod R through the leg 2, is directed at its center line (the line Y-Y' in FIG. 3) substantially at a right angle with respect to the longitudinal direction of the rod R, so that the fishing line P may be drawn out toward the tip of rod R through the hole 36 in the relation of being bent thereat substantially at a right angle with respect to the center line.

The cover 3 is also formed in a cup-like shape of a conical forehead, the forehead having the through hole 36 formed therein. It is preferably for through hole 36 to be bored eccentrically of the axis of the conical forehead, radially opposite to the line P drawn in the direction as shown by the arrow X in FIG. 2.

It is preferable that at one side of the conical forehead of the cover 3, a window 35 is formed for enabling the angler to insert his thumb into the cover 3. Although the window 35 is not so necessary it is preferable to facilitate the thumbing.

Furthermore, the cover 3, which is detachably mounted to the disc 1a of the reel body 1, is so constituted that at the cylindrical wall adjacent to the opening of the cover there are formed about two or four male partial threads 37 and at the outer periphery of the disc 1a, about two or four female partial threads 38 as shown in FIG. 5. The cover, which is provided with the eccentric through hole 36 and the window 35, is screwably secured to the disc 1a through the male and female partial threads 37 and 38 respectively. The window 35 faces toward the heel of the rod R carrying the reel therewith by turning the cover 3 180°, through the male threads 37 and female threads 38.

The spool 4, the rotatable frame 8, the transmission through which the rotatable shaft 9 is rotated by the handle shaft 24 and an anti-reverse-rotation mechanism for the handle shaft 24, which are all housed in the reel body 1, will hereinafter be detailed.

Firstly, the spool 4, which is sleeved onto the tubular shaft 5 to be fixed to the disc 1a in the relation of being easily turned over, comprises a drum 41 and a pair of discs 42 and 43 each diameter of which is larger than that of the drum 41. The discs 42 and 43, which are fixed to both sides of the drum 41, have a pair of arcuate slots 44 and 45 respectively, each pair of which is insertably retained by a pair of headed pins 7 protruding from the disc 1a. In addition, each of the slots 44 and 45 is made larger at one end than the head of each pin 7. Each pin 7 is inserted into the larger end portion, and the spool 4 is turned in each of the slots 44 and 45 to be retained by the pins 7. Alternatively, the spool is optionally mounted to the disc 1a through the discs 42 or 43 in contact therewith by turning over the spool 4.

Secondly, the rotatable frame 8, which serves to guide the fishing line being wound on the spool, is composed of a cylindrical member closed at one end thereof and provided with a center hole formed at the enclosed end. The rotatable frame is sleeved through the hole onto the end of the rotary shaft 9 coming out of the tubular shaft 5 and then tightened to the rotary shaft 9 by means of a nut 10 which makes it rotatable with the rotary shaft 9.

Also, the rotary frame 8, as shown in FIG. 3, is provided with a leaf spring 14 by which a fishing line guide lever 11 is radially supported along the inner surface of the enclosed end of the rotary frame 8. The guide lever 11 is smaller in length than the radius of the rotary frame 8. A guide slot 12 is formed at the lengthwise end of the guide lever 11 extending toward the center of the rotary frame 8, into which is inserted a guide pin 13 fixed to the enclosed end of the rotary frame 8, so that the guide lever 11 may be movable only in a radial direction. The guide lever 11 is normally urged toward the center of the rotary frame 8 by means of a coil spring 16 inserted between a notched portion 22 formed at the intermediate portion of the guide lever 11 and the inner surface of the cylindrical wall of the rotary frame 8, and, as shown in FIG. 3, is allowed to project at one end outwardly of the cylindrical wall of the rotary frame 8 through a hole 15 formed therein.

The rotary shaft 9 is made hollow to insert therein a freely movable rod 17. The rod 17 projects from one axial end of the rotary shaft 9 and has a plate stopper 18 of the longitudinal section as shown in FIG. 3, attached to the rod 17 in the relation of being movable axially of the rod 17. At the end portion of rod 17 a control plate 19 of a disc-like shape is retained by a snap ring 20. A coil spring 21 is inserted onto the rod between the control plate 19 and the stopper 18 so that the stopper 18 may in normal abut against the end face of the rotary shaft 9 and be engaged at its tail end with the notched portion 22 formed on the guide lever 11, thereby to keep the guide lever 11 projecting from the cylindrical wall of the rotary frame 8.

The control plate 19 is pushed against the spring 21 to swing stopper 18 from engagement of its tail end with the notched portion 22, thereby moving the guide lever 11 radially inwardly, i.e., toward the center of the rotary frame 8, by means of the spring 16.

At the fore end of tubular shaft 5 corresponding to the radially inward end of guide lever 11 are formed a round portion 5a and a cam portion 5b, which are in contact with the innermost end of the guide lever 11. The round portion 5a and cam portion 5b serve to move the guide lever 11 in such a manner that the rotary frame 8 rotates to allow the already backed guide lever 11 to be shifted from its radially innermost end at 6a to the cam portion 5b so that the cam 5b forces the guide lever 11 to be protruded outwardly of the rotatable frame 8 against the coil spring 16.

Thirdly, the transmission, through which the rotary frame 8 is rotatable by the handle shaft 24, comprises a master gear 25 and a pinion 9a in mesh therewith. The master gear 25 is fixed to an inner end of the handle shaft 24. The pinion 9a, is fixed to an inner axial end of the rotary shaft 9. The handle shaft 24 is provided at its outer axial end with a handle bar 23, so that the handle shaft 24 may be operated by the handle bar 23 to rotate the rotatable shaft 9 through the aforesaid transmission, resulting in rotating the rotatable frame 8 fixed to the rotatable shaft 9.

Lastly, the anti-reverse-rotation mechanism comprises an anti-reverse gear 26 and a pair of retaining pawls 27a and 27b in mesh therewith. The gear 26 is fixed to the handle shaft 24 or rotatable shaft 9, preferably to the handle shaft 24 as shown in FIG. 1. The pawls 27a and 27b, which may be isolated, are formed mainly at both ends of a pawl carrier 27, the pawl carrier 27 being pivoted to the reel body 1 through a pivot 29. The carrier 27 has thin plates sandwiching therebetween the gear 26 in contact with both sides thereof respectively. Gear 26 is tightly held between the thin plates so that the gear 26 in rotation allows the carrier 27 to swing around the pivot 29, whereby one of the pawls 27a and 27b is engaged with the gear 26 to prevent the reverse rotation of the handle shaft 24.

The pawls 27a and 27b of the anti-reverse-rotation mechanism constructed as aforegoing, are meshed alternately with the gear 26 correspondingly to the rotation direction thereof. In other words, when the handle shaft 24 rotates normally, i.e., when the handle shaft 24 is rotated to wind the line on the spool in the direction of the arrow A in FIG. 6, the pawl 27b is restricted from being meshed with the gear 26. However, the pawl 27a only is active to be mesh therewith only when the gear 26 rotates reversely as shown by the arrow in the dotted line in FIG. 6, thereby to prevent the reverse rotation of the handle shaft 24. On the contrary, when the handle shaft 24 is normally rotatable in the direction shown by the arrow B in FIG. 7, the pawl 27a is restricted and 27b active, so that the pawl 27b is meshed with the gear 26 only when the gear 26 rotates reversely in the direction as shown by the arrow in the dotted line in FIG. 7, thereby to prevent the handle shaft 24 from reversely rotating.

The pawls 27a and 27b are, as shown in FIGS. 6, 7 and 8, restricted by a control 31 having a lever 30. The control 31 is formed of a short tubular member pivoted to the casing 1b of the reel body 1 through a pivot 31a formed eccentrically at the one axial end of the tubular member, whereby the control 31 can move in eccentric through the pivot 31a.

The pawl carrier 27 is provided at a substantially intermediate portion thereof with a pin 32 which protrudes at the position away from the axis of the pivot 29 toward the pawl 27b, the pin 32 being entered into the tubular control 31. Hence, the lever 30 is turned to allow the control 31 to move eccentrically so that the control 31 may be changed, as shown in FIGS. 6 to 7, in the positional relation with respect to the pin 32, thereby restricting each of the pawls 27a and 27b from being meshed with the gear 26. In detail, the pawl carrier 27, which is shown in the aforesaid normal rotation direction A in FIG. 6, tends to swing through the thin plates 28 in the direction of the arrow C in FIG. 6 around the pivot 29, but the pin 32 is restricted by the control 31 to prevent the carrier 27 from its swinging, resulting in non-mesh of the pawl 27b with the gear 26. When the normal rotation is changed from the direction of the arrow A to B in FIG. 7, the carrier 27 similarly tends to swing in the direction of the arrow D in FIG. 7 around the pivot 29, but the changed positional relation caused by the eccentric motion of the control 31 with respect to the pin 32, allows the control 31 to restrict the pin 32, thereby preventing the aforesaid swinging. Thus, when the rotatable shaft 24 rotates in the direction shown by the arrows of dotted line in FIGS. 6 and 7, i.e., in the reverse rotation, only one of the pawls 27a and 27b acts to prevent the rotatable shaft 9 from reversely rotating.

Alternatively, the control 31 may be formed of a plate member of a crescent-shape, having at both ends thereof portions in contact with the pawl carrier 27.

Figure 11:
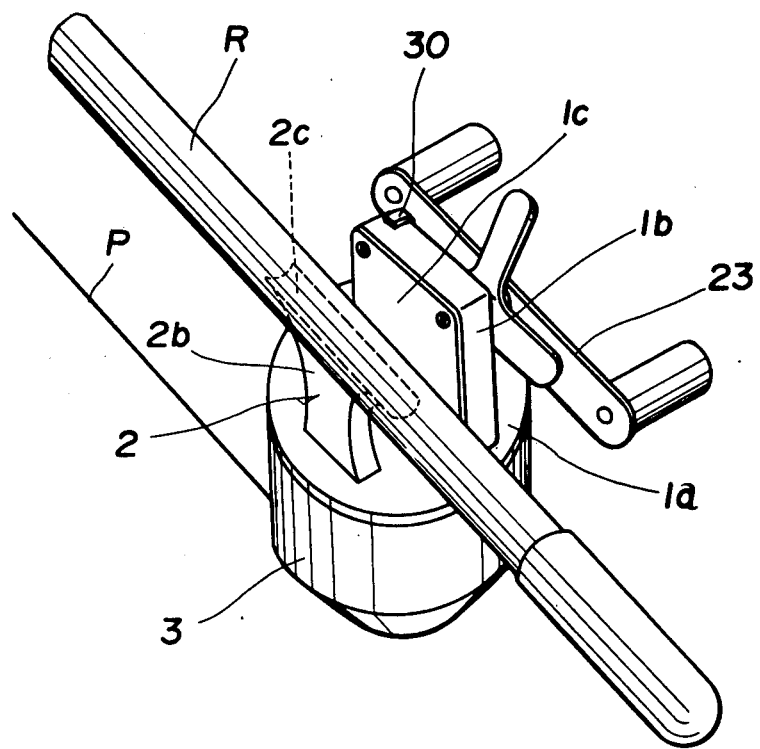
Figure 12:
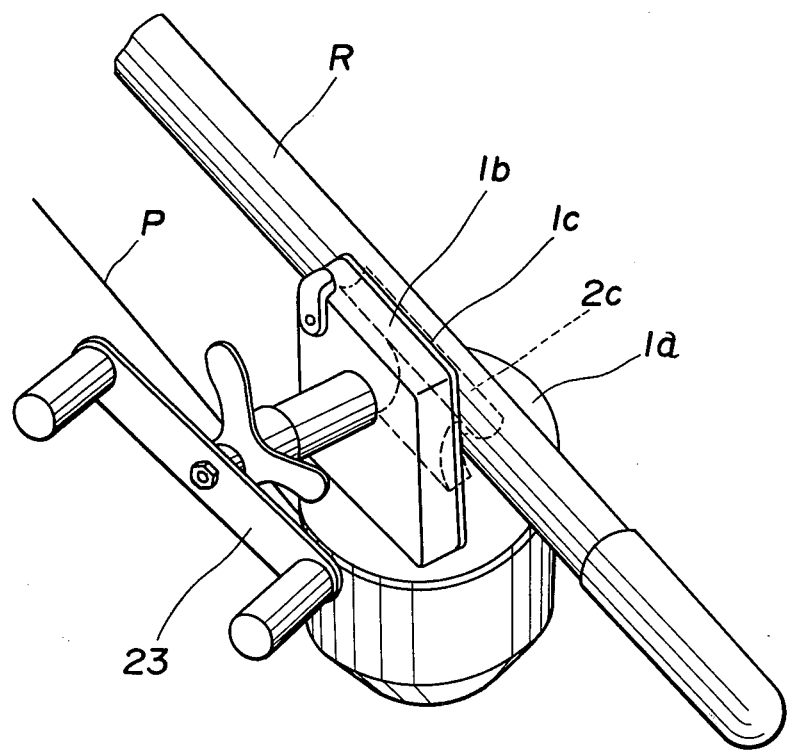

The fishing reel of the invention, which is constructed as aforegoing, is, as shown in FIG. 9, mounted to the fishing rod R through the mounting leg 2 at a selective one of four positions. The four positions are; a first position as shown in FIG. 9, where the reel body 1 is located above the rod R and the handle bar 23 is at the right hand when the angler grips the rod for fishing; a second position as shown in FIG. 10, where the reel body 1 is above the rod R and the handle bar 23 is at the left hand; a third position as shown in FIG. 11, where the reel body 1 is below the rod R and the handle bar 23 is at the right hand; and a fourth position as shown in FIG. 12, where the reel body 1 is below the rod R and the handle bar is at the left hand. The four positions are selective by the angler by turning over the spool, changing the mesh of each of the retaining pawls 27a and 27b with the anti-reverse gear 26, or turning the cover 3 from side to side. For example, on the basis of the first position shown in FIG. 9, when the reel mounting position is changed from the first to the second position shown in FIG. 10, the rotary frame 8 for winding the line on the spool 4 is reversely rotated. Hence, the spool 4 should be turned over to be fixed to the disc 1a of the reel body 1 through the disc 43 in contact with the disc 1a. The control lever 30, when the gear 26 is to be meshed with the pawl 27a is, operated to change the carrier 27 in its swinging motion so that the gear 26 may be meshed with the pawl 27b; and the cover 3 is half turned by changing the screwable engagement of the partial male threads 37 with female threads 38 so that the window 35 at the cover 3 may face the angler even at the second position. When the reel mounting position is changed from the first to the third as shown in FIG. 11, the cover 3 only is half turned from the first position, and when changed to the fourth position, the reel body should have the spool 4 turned over and the pawl 27b changed to be meshed with the gear 26.

For casting by use of the reel of the invention, the angler inserts the thumb or forefinger of his hand gripping the rod R into the cover 3 through the window 35, and presses the control plate 19 by the finger against the force of spring 21. Hence, the control plate 19 contacts the stopper 18 which swings the tail end thereof to release its engagement with the notched portion 22 of the guide lever 11, whereby the guide lever 11 moves radially inwardly by the spring 16 force. As a result, the fishing line P wound on the spool 4 and drawn out through the hole 36 is released from the guide lever 11 and simultaneously is retained by the angler's finger pressing the control plate 19, thus carrying out the casting in the abovementioned condition. Namely, the angler removes his finger from the pressed control plate 19 during casting so as to cast the plug at the end of line toward the desired place. At this time, the line P is being drawn from the spool 4 between the control plate 19 and the aforesaid angler's finger. Hence, the line P is slowed therebetween and also an interval between the control plate 19 and finger is desirably changed to allow the line to be adjustably slowed, thereby properly carrying out the so-called thumbing.

On the other hand, the handle bar 23 is operated to allow the rotatable frame 8 to rotate and the guide lever 11 to advance when the line with a hooked fish is to be wound on the spool 4. In other words, since the guide lever 11 moved radially inwardly for casting abuts at one end against the round portion 5a, the stopper 18, when the control plate 19 is released from being pressed, tends to be restored by the resilient force of the spring 21. The tail end of the stopper 18 again abuts against the upper side of the guide lever 11 already moved radially outwardly. The stopper 18 has pushed the guide lever 11 toward the spool 4 side and the inner most end of the guide lever 11 is shifted to the cam portion 5b. As a result, the guide lever 11 rotates following the rotatable frame 8 and advances through the cam portion 5b so as to protrude beyond the spring 16 from the cylindrical wall of the rotary frame 8 through a hole 15 formed therein, and is thereafter kept protruded through the engagement of the tail end of the stopper 18 having fallen within the notched portion 22. The tail is caught by the guide lever 11 and wound on the spool 4 while the rotary frame 8 is rotated by the handle bar 23. When a hooked fish is too heavy for the line, the angler presses the control plate 19 immediately releasing the guide lever 11 from the line, so that the line may be run and be slowed by the angler's finger and the control plate 19.

The window 35, which is provided in the aforesaid embodiment, is not absolutely necessary so that a control lever for the stopper 18, when no window is formed, may be provided outside the casing 1b as in the conventionally closed face reel.

Also, the mounting leg 2 may be integrated with the disc 1a or the lid 1c at the reel body 1. Thus, the mounting leg 2 integrated with the lid 1c can be fixed to the reel body 1 through the lid 1c fixed to the disc 1a and the casing 1b.

While the embodiments of the invention as herein disclosed constitute preferred forms, it is to be understood that other form might be adopted, all coming within the scope of the claims which follow.

What is claimed is:

1. A fishing reel mountable to a fishing rod for winding a fishing line on a spool by operating a handle bar, said fishing reel comprising:

(a) a reel body, said reel body having a handle shaft, a rotatable shaft, a transmission and an anti-reverse-rotation mechanism, said handle shaft being provided with said handle bar fixed thereto, said rotatable shaft having an axis directed to intersect with an axis of said handle shaft and being rotatable by said handle shaft to said rotatable shaft, said anti-reverse-rotation mechanism preventing said handle shaft from reversely rotating and comprising a gear and a pair of retaining pawls on a pivotally mounted carrier and meshable with said gear, said gear being fixed to one of said handle shaft and said rotatable shaft, said pawls being pivotally mounted to said reel body, each of said pawls being meshable with said gear individually with respect to the different rotational direction of said handle shaft, (b) a spool for winding said fishing line thereon said spool comprising a drum having an inner diameter larger than the outer diameter of said rotatable shaft and a pair of flanges formed at the axial ends of said drum, said spool being mounted around said rotatable shaft at the reel body in the relation of being capable of being turned over and of being non-rotatable with respect to said reel body, (c) a rotatable frame fixed to said rotatable shaft to be rotatable in cooperation therewith, said rotatable frame having a guide lever for guiding said fishing line onto said spool, (d) a cover for said spool and rotatable frame, said cover being detachably mounted to said reel body and having at the center portion a through hole through which said fishing lines passes, (e) a mounting leg for mounting said reel body to said fishing rod, said mounting leg extending parallel to the axis of said rotatable shaft and having at the end of the extension a mounting seat face extending lengthwise to be substantially at the right angle with respect to the axis of said rotatable shaft, so that said reel body is mounted to said fishing rod through said mounting leg in such a manner that the center line of said through hole is directed substantially at a right angle to the longitudinal direction of said fishing rod, whereby said fishing line is drawn out through said through hole toward the tip of said rod so as to be bent substantially at a right angle with respect to the center line of said through hole, and (f) a control including a control lever for controlling one of said two retaining pawls of the anti-reverse-rotation mechanism, said control being mounted to said reel body by a pivot spaced from the pivot point of said pawl carrier, said control lever being mounted on an eccentric pivot on said reel body and having pin means protruding therefrom at a position outside the axis of the pivot of the carrier so as to contact the carrier to control the meshing of the pawls with the anti-reverse gear.

* * * * *